(12) United States Patent
Kim et al.

(10) Patent No.: US 9,853,285 B2
(45) Date of Patent: Dec. 26, 2017

(54) METHOD FOR MANUFACTURING ELECTRODE FOR LITHIUM-SULFUR BATTERY AND LITHIUM-SULFUR BATTERY

(71) Applicant: PUSAN NATIONAL UNIVERSITY INDUSTRY-UNIVERSITY COOPERATION FOUNDATION [KR/KR], Busan (KR)

(72) Inventors: Yong-Tae Kim, Busan (KR); Tae-Gyung Jeong, Busan (KR); Hyung-Sun Kim, Seoul (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 299 days.

(21) Appl. No.: 14/421,989

(22) PCT Filed: Aug. 14, 2013

(86) PCT No.: PCT/KR2013/007330
§ 371 (c)(1),
(2) Date: Feb. 16, 2015

(87) PCT Pub. No.: WO2014/027841
PCT Pub. Date: Feb. 20, 2014

(65) Prior Publication Data
US 2015/0221937 A1    Aug. 6, 2015

(30) Foreign Application Priority Data
Aug. 16, 2012   (KR) .................. 10-2012-0089628

(51) Int. Cl.
*H01M 4/36*   (2006.01)
*H01M 10/052*   (2010.01)
(Continued)

(52) U.S. Cl.
CPC ......... *H01M 4/366* (2013.01); *H01M 2/1673* (2013.01); *H01M 4/0433* (2013.01);
(Continued)

(58) Field of Classification Search
CPC .... H01M 4/366; H01M 4/1397; H01M 4/136; H01M 4/587; H01M 4/0433;
(Continued)

(56) References Cited

U.S. PATENT DOCUMENTS 6,632,569 B1 *  10/2003  Kameda ................ H01M 4/133
                                                              252/502
7,029,796 B2 *   4/2006  Choi ..................... H01M 4/136
                                                              252/182.1
(Continued)

FOREIGN PATENT DOCUMENTS

JP          08078016 A      3/1996
JP        2011029199 A      2/2011
(Continued)

OTHER PUBLICATIONS

International Search Report, International Application No. PCT/KR2013/007330, 2 pages, Nov. 4, 2013.

*Primary Examiner* — Ula C Ruddock
*Assistant Examiner* — Matthew Van Oudenaren
(74) *Attorney, Agent, or Firm* — Additon, Higgins & Pendleton, P.A.

(57) ABSTRACT

Provided are a method of fabricating an anode for lithium-sulfur batteries and a lithium-sulfur battery. The method includes: mixing a carbon raw material and a binder; obtaining a carbon layer by preparing the mixture of the carbon raw material and the binder in the form of a layer; drying the carbon layer; forming a carbon thin layer by compressing the dried carbon layer; and stacking the carbon thin layer on an anode for lithium-sulfur batteries.

15 Claims, 3 Drawing Sheets

(51) Int. Cl.

| | |
|---|---|
| *H01M 4/133* | (2010.01) |
| *H01M 4/587* | (2010.01) |
| *H01M 4/04* | (2006.01) |
| *H01M 4/58* | (2010.01) |
| *H01M 2/16* | (2006.01) |
| *H01M 4/136* | (2010.01) |
| *H01M 4/1397* | (2010.01) |
| *H01M 10/42* | (2006.01) |
| *H01M 4/02* | (2006.01) |

(52) U.S. Cl.
CPC ........... *H01M 4/133* (2013.01); *H01M 4/136* (2013.01); *H01M 4/1397* (2013.01); *H01M 4/587* (2013.01); *H01M 4/5815* (2013.01); *H01M 10/052* (2013.01); *H01M 10/4235* (2013.01); *H01M 2004/027* (2013.01); *Y10T 29/49117* (2015.01)

(58) Field of Classification Search
CPC .. H01M 4/133; H01M 4/5815; H01M 2/1673; H01M 10/4235; H01M 10/052; H01M 2004/027
See application file for complete search history.

(56) References Cited

U.S. PATENT DOCUMENTS

| | | | |
|---|---|---|---|
| 2008/0076030 A1* | 3/2008 | Inagaki | H01M 4/623 429/330 |
| 2012/0088154 A1 | 4/2012 | Liu et al. | |
| 2013/0202961 A1* | 8/2013 | Hagen | H01M 4/0404 429/211 |

FOREIGN PATENT DOCUMENTS

| | | | |
|---|---|---|---|
| KR | 1020020004053 A | | 1/2002 |
| KR | 1020020011562 A | | 2/2002 |
| KR | 1020050022567 | * | 3/2005 |
| KR | 1020050022567 A | | 3/2005 |
| WO | WO2012001152 | * | 1/2012 |

* cited by examiner

[Fig. 1]
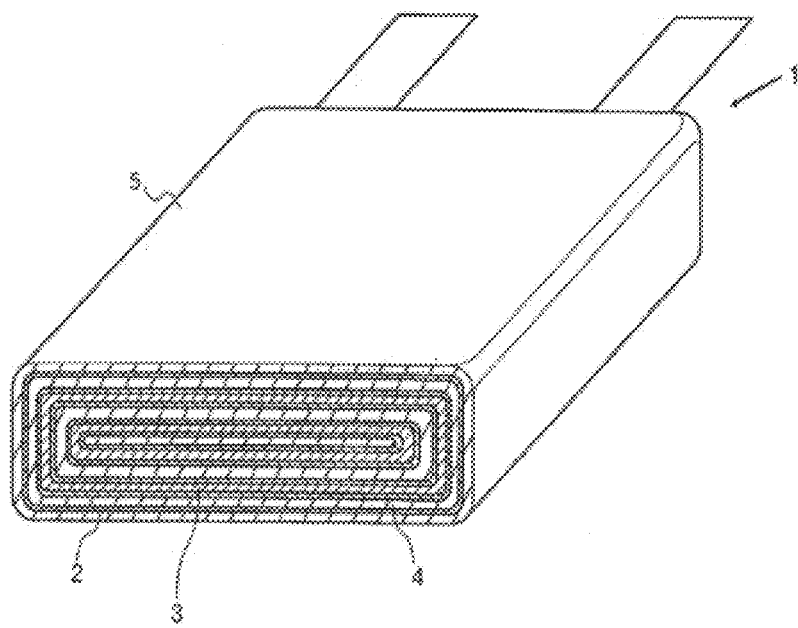
[Fig. 2]
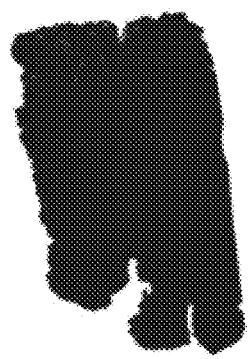

[Fig. 3]
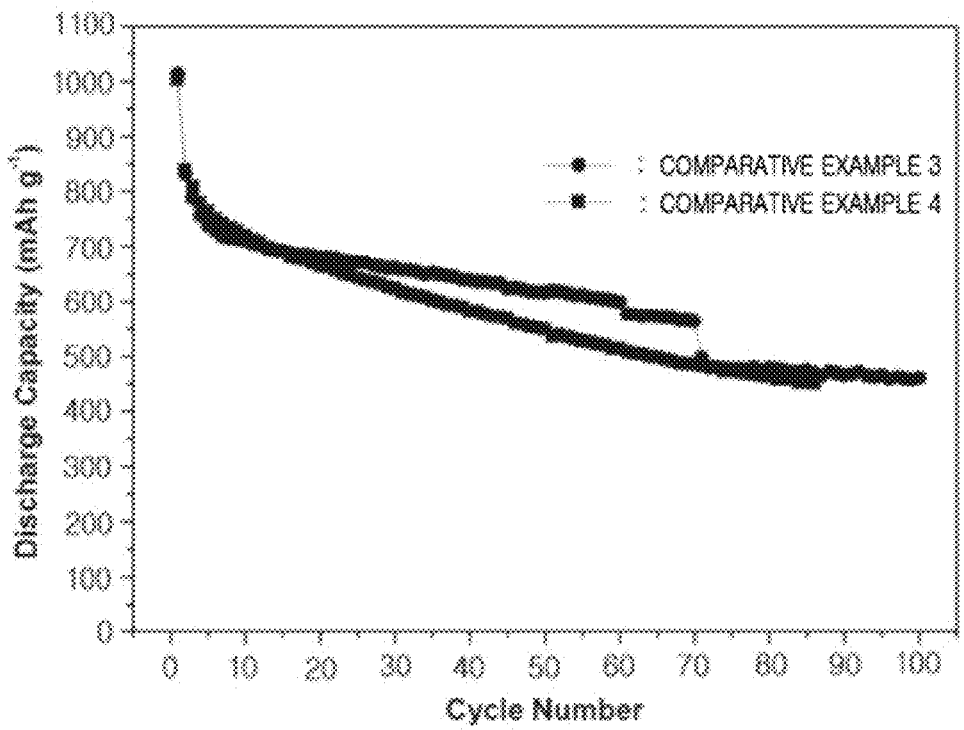
[Fig. 4]
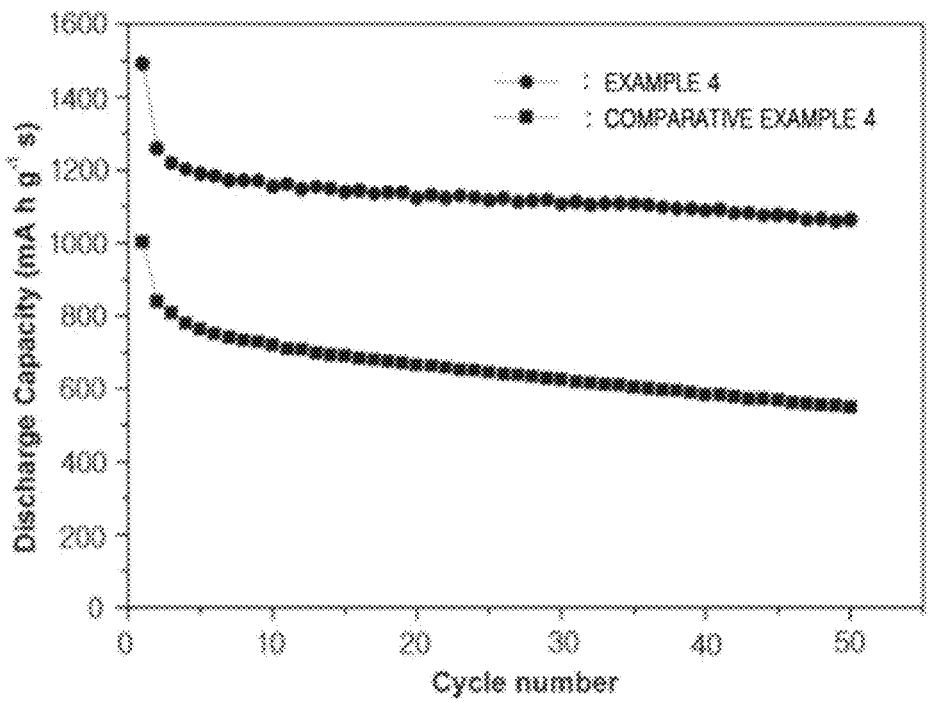

[Fig. 5]
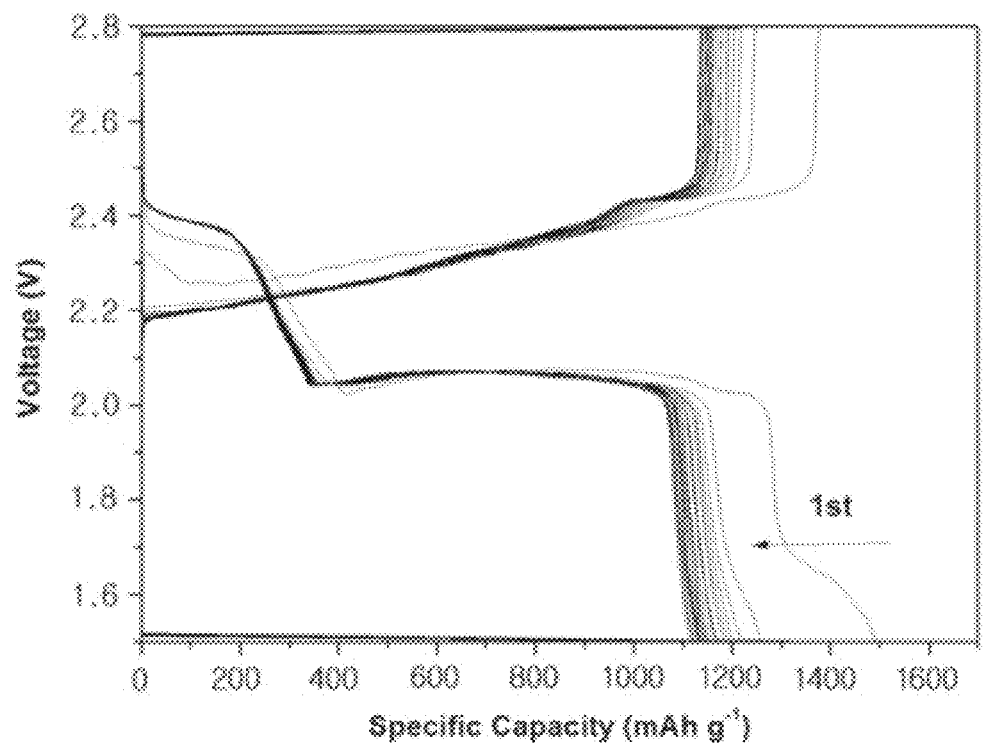
[Fig. 6]
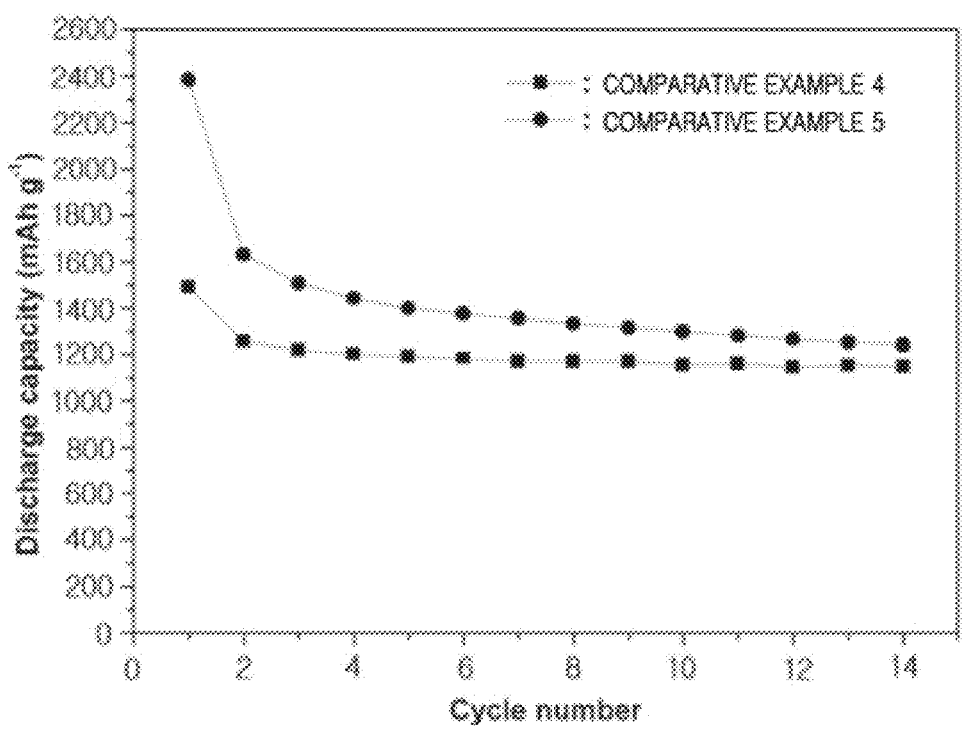

METHOD FOR MANUFACTURING ELECTRODE FOR LITHIUM-SULFUR BATTERY AND LITHIUM-SULFUR BATTERY

CROSS REFERENCE TO RELATED APPLICATIONS

This application claims priority to and the benefit of International Application No. PCT/KR2013/007330, filed on Aug. 14, 2013, which published as WO2014/027841, and further claims priority to Korean Patent Application No. 10-2012-0089628, filed in the Korean Intellectual Property Office on Aug. 16, 2012, the entire disclosure of which is incorporated by reference.

FIELD OF THE INVENTION

The present invention relates to a method of fabricating an anode for lithium-sulfur batteries and a lithium-sulfur battery.

BACKGROUND

The rapid development of portable electronic devices is increasing the demand for secondary batteries. In particular, the trend toward smaller, lighter, thinner and more compact portable electronic devices is continuously requiring the introduction of high-energy density batteries as well as inexpensive, safe, and environment-friendly batteries.

A lithium-sulfur battery uses active materials that are inexpensive and environment-friendly. In addition, lithium is expected to have a high energy density of 3830 mAh/g, and sulfur is expected to have a high energy density of 1675 mAh/g. Therefore, the lithium-sulfur battery is emerging as the most promising battery that can satisfy the above conditions.

The lithium-sulfur battery is a secondary battery that uses a sulfur-based compound having a sulfur-sulfur (S—S) combination as an anode active material and a carbon-based material, in which insertion and removal of alkali metal such as lithium or metal ions such as lithium ions occur, as a cathode active material. During a reduction reaction (during discharge), the S—S combination is broken, thereby reducing the oxidation number of S. During an oxidation reaction (during charge), the oxidation number of S increases, thereby forming the S—S combination again. Using this oxidation-reduction reaction, the lithium-sulfur battery stores and generates electrical energy.

The lithium-sulfur battery has an energy density of 3830 mAh/g when using lithium metal as the cathode active material and has an energy density of 1675 mAh/g when using elemental sulfur (S8) as the anode active material. Therefore, the lithium-sulfur battery is the most promising battery in terms of energy density among batteries developed so far. In addition, a sulfur-based material used as the anode active material is an inexpensive and environment-friendly material.

However, there have been no successful examples of commercializing a lithium-sulfur battery system. The failure to commercialize a lithium-sulfur battery is due to a low utilization rate of sulfur when sulfur is used as an active material. Here, the utilization rate of sulfur is represented by a ratio of the amount of sulfur that participates in an electrochemical oxidation-reduction reaction within a battery to the amount of sulfur input. The low utilization rate of sulfur results in a very low battery capacity in reality, compared with a theoretical battery capacity.

In addition, in the lithium-sulfur battery, polysulfide melts out from an anode and moves between the anode and a cathode during charge or discharge. This shuttle phenomenon can affect capacity and cycle characteristics.

Aspects of the present invention provide a need in the art for a method of fabricating an anode for lithium-sulfur batteries, the anode capable of improving the shuttle phenomenon of a lithium-sulfur battery.

Aspects of the present invention also provide a need in the art for a lithium-sulfur battery including an anode fabricated using the method.

However, aspects of the present invention are not restricted to the one set forth herein. The above and other aspects of the present invention will become more apparent to one of ordinary skill in the art to which the present invention pertains by referencing the detailed description of the present invention given below.

BRIEF SUMMARY OF THE INVENTION

In one aspect, this disclosure describes a method of fabricating an anode for lithium-sulfur batteries, the method including mixing a carbon raw material and a binder, obtaining a carbon layer by preparing the mixture of the carbon raw material and the binder in the form of a layer; drying the carbon layer; forming a carbon thin layer by compressing the dried carbon layer; and stacking the carbon thin layer on an anode for lithium-sulfur batteries.

In another embodiment, this disclosure describes an anode for lithium-sulfur batteries, the anode including: a collector; an anode active material layer which is located on a surface of the collector; and a carbon thin layer which is located on a surface of the anode active material layer, wherein the carbon thin layer has a thickness of 0.1 to 0.3 mm.

In yet another embodiment, this disclosure describes a lithium-sulfur battery including an anode which contains an anode active material; a cathode which contains a cathode active material; a separator which is located between the anode and the cathode; and a carbon thin layer which is located between the anode and the separator, wherein the carbon thin layer has a thickness of 0.1 to 0.3 mm.

BRIEF DESCRIPTION OF THE FIGURES

The aspects and features of the present invention will become more apparent by describing in detail exemplary embodiments thereof with reference to the attached drawings, in which:

FIG. 1 is a perspective view of a lithium-sulfur battery;

FIG. 2 is a photograph of a carbon thin layer prepared in Example 1;

FIG. 3 illustrates data obtained by evaluating characteristics of cells of Comparative Examples 3 and 4;

FIG. 4 illustrates data obtained by evaluating characteristics of cells of Example 4 and Comparative Example 4;

FIG. 5 illustrates voltage curve data of the cell according to Example 4; and

FIG. 6 illustrates data obtained by evaluating characteristics of cells of Examples 4 and 5.

DETAILED DESCRIPTION

Technical Solution

According to an aspect of the present invention, there is provided a method of fabricating an anode for lithium-sulfur batteries. The method includes: mixing a carbon raw material and a binder; obtaining a carbon layer by preparing the mixture of the carbon raw material and the binder in the form of a layer; drying the carbon layer; forming a carbon thin layer by compressing the dried carbon layer; and stacking the carbon thin layer on an anode for lithium-sulfur batteries.

The carbon raw material may be ketjen black, denka black, acetylene black, Super-p, carbon black, graphene, or any combination thereof.

The drying of the carbon layer may be performed at 50 to 100° C.

A weight ratio of the binder to the carbon raw material may be in a range of 0.8 to 1.2.

The carbon layer may have a thickness of 0.8 to 1.2 mm.

The carbon thin layer may have a thickness of 0.1 to 0.3 mm.

The method may further include coating a catalyst on the carbon thin layer.

The catalyst may be coated on the carbon thin layer in an amount of 1 to 5% by weight of the carbon thin layer.

A catalyst may be added in the mixing of the carbon raw material and the binder.

The catalyst may be added in an amount of 20 to 60% by weight of the carbon raw material.

The catalyst may be metal nitride.

The metal nitride may be titanium nitride (TiN).

The metal nitride may have a grain size of 1 to 5 μm.

The anode for lithium-sulfur batteries may include a collector and an anode active material layer, and the carbon thin layer may be stacked on the anode active material layer.

The anode active material layer may include an anode active material, a binder, and a conductive material.

The anode active material may include one or more sulfur compounds selected from the group consisting of catholyte in which elemental sulfur (S8), solid Li2Sn (n≥1), and Li2Sn (n≥1) are dissolved, an organosulfur compound, and a carbon-sulfur polymer [(C2Sx)n, where x=2.5 to 50, and n≥2].

According to another aspect of the present invention, there is provided a lithium-sulfur battery including: an anode which is fabricated using the above method; a cathode which contains a cathode active material selected from the group consisting of a material that can reversibly intercalate or deintercalate lithium ions, a material that can reversibly form a compound with lithium, a lithium metal, and a lithium alloy; and an electrolyte which contains lithium salt and an organic solvent.

The organic solvent may be one or more solvents selected from the group consisting of benzene, fluorobenzene, toluene, trifluoro toluene, xylene, cyclohexane, tetrahydrofuran, 2-methyl tetrahydrofuran, cyclohexanone, ethanol, isopropyl alcohol, dimethyl carbonate, ethyl methyl carbonate, diethyl carbonate, methyl propyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, v-butyrolactone, and sulfolane.

The lithium salt may be one or more compounds selected from the group consisting of lithium trifluoromethanesulfonimide, lithium triflate, lithium perclorate, lithium hexafluoroarsenate (LiAsF6), lithium trifluoromethanesulfonate (CF3SO3Li), LiPF6, LiBF4, tetraalkylammonium, and salts in a liquid state at room temperature.

The electrolyte may contain the lithium salt at a concentration of 0.5 to 2.0 M.

An aspect of the present invention can provide a method of fabricating an anode for lithium-sulfur batteries, the anode capable of improving the shuttle phenomenon of a lithium-sulfur battery.

Another aspect of the present invention can provide a lithium-sulfur battery including an anode fabricated using the method.

However, the effects of the present invention are not restricted to the one set forth herein. The above and other effects of the present invention will become more apparent to one of daily skill in the art to which the present invention pertains by referencing the claims.

Hereinafter, embodiments of the present invention will be described in further detail. It is to be understood that both the foregoing general description and the following detailed description are exemplary and explanatory and are intended to provide further explanation of the invention as claimed.

In an embodiment of the present invention, a method of fabricating an anode for lithium-sulfur batteries is provided. The method includes: mixing a carbon raw material and a binder; obtaining a carbon layer by preparing the mixture of the carbon raw material and the binder in the form of a layer; drying the carbon layer; forming a carbon thin layer by compressing the dried carbon layer; and stacking the carbon thin layer on an anode for lithium-sulfur batteries.

In a conventional lithium-sulfur battery, polysulfide melts out from an anode and moves between the anode and a cathode during charge or discharge. This is generally called a shuttle phenomenon.

The shuttle phenomenon can cause problems with the capacity and cycle characteristics of a battery.

To solve the problems, a carbon layer may be stacked on a surface of an anode in the embodiment of the present invention.

More specifically, in the method of fabricating an anode for lithium-sulfur batteries according to the embodiment of the present invention, a carbon thin layer is formed separately from an anode and then stacked on the anode.

Generally, if an electrode formed by ball-mixing carbon, sulfur and a binder is used, the sulfur may melt out from the electrode in the form of polysulfide during charge or discharge. This reduces characteristics or useful life of a battery. In addition, as the sulfur reacts with lithium, Li2S having non-conductivity accumulates on an electrode surface layer and a carbon layer (matrix), thereby reducing electrical conductivity.

However, if a carbon thin layer is formed separately from an electrode (anode) as in the embodiment of the present invention, although polysulfide melts out from the electrode, it is directly hindered by the carbon thin layer from shuttling to a lithium cathode. This increases characteristics or useful life of a battery. In addition, although Li2S is formed between the electrode and the carbon thin layer, the carbon thin layer can reduce a reduction in conductivity.

More specifically, the carbon raw material may be, but is not limited to, ketjen black, denka black, acetylene black, Super-p, carbon black, graphene, or any combination thereof.

The drying of the carbon layer may be performed at 50 to 100° C. In this temperature range, moisture present in carbon can evaporate, and a solvent (e.g., ethanol) can be removed.

A weight ratio of the binder to the carbon raw material may be in a range of 0.8 to 1.2. Since carbons can be sufficiently bonded together in this range, the carbon layer can be prevented from being broken.

The carbon layer may have a thickness of 0.8 to 1.2 mm. In this thickness range, the carbon layer can be effectively dried in the drying of the carbon layer.

The carbon thin layer may have a thickness of 0.1 to 0.3 mm. In this thickness range, the shuttle phenomenon can be effectively suppressed.

In the mixing of the carbon raw material and the binder, a catalyst may be added. Since the carbon thin layer is formed by mixing the catalyst with the carbon raw material, it may further contain the catalyst. The carbon thin layer that contains the catalyst can effectively suppress the shuttle phenomenon. The catalyst may be added in an amount of 20 to 60% by weight of the carbon raw material. In this range, the shuttle phenomenon can be effectively suppressed.

To add the catalyst to the carbon thin layer, the method may further include coating the catalyst on the carbon thin layer. If the catalyst is coated on the carbon thin layer, the shuttle phenomenon can be effectively suppressed. The catalyst may be coated on the carbon thin layer in an amount of 1 to 5% by weight of the carbon thin layer. In this range, the shuttle phenomenon can be effectively suppressed.

The catalyst may be metal nitride.

In a more specific example, the metal nitride may have superior electrical conductivity.

The metal nitride itself may activate a reaction with sulfur.

In addition, the sulfur may adhere to a surface of the metal nitride, thereby reducing the shuttle phenomenon. As a result, a utilization rate of the sulfur may increase.

The metal nitride may be titanium nitride (TiN). However, the metal nitride is not limited to TiN as long as effects of the present invention are limited.

The metal nitride may have a grain size of 1 to 5 μm. In this grain size range, the shuttle phenomenon can be effectively suppressed.

The anode for lithium-sulfur batteries includes a collector and an anode active material layer. The carbon thin layer may be stacked on the anode active material layer.

In addition, the anode active material layer may include an anode active material, a binder, and a conductive material.

The anode active material may include one or more sulfur-based materials selected from the group consisting of catholyte in which elemental sulfur ($S_8$), solid $Li_2S_n$ (n≥1), and $Li_2S_n$ (n≥1) are dissolved, an organosulfur compound, and a carbon-sulfur polymer [$(C_2S_x)_n$, where x=2.5 to 50, and n≥2].

The conductive material used to make electrons move smoothly within the anode active material is not limited to a particular material but may be a conducting material, such as a graphite-based material or a carbon-based material, or a conducting polymer. The graphite-based material may be, for example, KS 6 (produced by Timcal Graphite & Carbon), and the carbon-based material may be, for example, Super P (produced by MMM Group Ltd.), ketjen black, denka black, acetylene black, carbon black, or graphene. Examples of the conducting polymer include polyaniline, polythiophene, polyacetylene, and polypyrrole. These conductive materials may be used alone or in mixture of two or more thereof.

In addition, examples of the binder that attaches the anode active material to the collector include poly(vinyl acetate), polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride, a copolymer (product name: Kynar) of polyhexafluoropropylene and polyvinylidene fluoride, poly(ethyl acrylate), polytetrafluoroethylene, polyvinyl chloride, polyacrylonitrile, polyvinyl pyridine, polystyrene, and derivatives, blends and copolymers thereof.

The anode according to the embodiment of the present invention may be fabricated by coating a composition having the anode active material, the conductive material and the binder dispersed in a solvent on the collector and drying the composition coated on the collector.

A solvent used to make the composition slurry may be a solvent that can evenly disperse the sulfur-based active material, the binder, and the conductive material and that easily evaporates. Typical examples of the solvent may include acetonitrile, methanol, ethanol, tetrahydrofuran, water, isopropyl alcohol, and dimethylformamide.

The amounts of the solvent, the sulfur compound, and, optionally, additives contained in the slurry do not have a particularly significant meaning. The solvent, the sulfur compound, and the additives can be contained in the slurry in any amounts as long as the slurry has an appropriate viscosity that allows the slurry to be easily coated.

The collector is not limited to a particular material but may be made of a conductive material such as stainless steel, aluminum, copper, or titanium. In particular, a carbon-coated aluminum collector is preferred. An aluminum substrate coated with carbon has superior adhesion to an active material, has low contact resistance, and can prevent corrosion by polysulfide of aluminum, as compared with an aluminum substrate not coated with carbon.

A lithium-sulfur battery 1 including the anode is illustrated in FIG. 1. Referring to FIG. 1, the lithium-sulfur battery 1 includes an anode 3, a cathode 4, and a battery can 5 including a separator which is located between the anode 3 and the cathode 4.

The cathode may be made of a cathode active material such as a material that can reversibly intercalate lithium ions, a material that can reversibly form a compound with a lithium metal, a lithium metal, or a lithium alloy.

The material that can reversibly intercalate the lithium ions may be a carbon material, specifically, any carbon cathode active material generally used in a lithium ion secondary battery. Typical examples of the material that can reversibly intercalate the lithium ions include crystalline carbon, amorphous carbon, and a combination thereof. Typical examples of the material that can reversibly form a lithium-containing compound by reacting with the lithium ions include, but not limited to, tin oxide ($SnO_2$), titanium nitrate, and silicon (Si). The lithium alloy may be an alloy of lithium and a metal selected from the group consisting of Na, K, Rb, Cs, Fr, Be, Mg, Ca, Sr, Ba, Ra, Al and Sn.

The cathode may also be a structure having an inorganic protective layer, an organic protective layer, or a stack thereof formed on the surface of the lithium metal.

The inorganic protective layer is made of a material selected from the group consisting of Mg, Al, B, C, Sn, Pb, Cd, Si, In, Ga, lithium silicate, lithium borate, lithium phosphate, lithium phosphorus nitride, lithium silicon sulfide, lithium borosulfide, lithium alumino sulfide, and lithium phosphorus sulfide. The organic protective layer is made of a conductive monomer, oligomer, or polymer selected from the group consisting of poly(p-phenylene), polyacetylene, poly(p-phenylene vinylene), polyaniline, polypyrrole, polythiophene, poly(2,5-ethylene vinylene), acetylene, poly(peri naphthalene), polyacene, and poly(naphthalene-2,6-diyl).

In addition, in the process of charging or discharging a lithium-sulfur battery, sulfur used as the anode active material may change to an inactive material and adhere to the surface of the lithium cathode. Inactive sulfur refers to sulfur that has undergone various electrochemical or chemical reactions and can no longer participate in electrochemical reactions of the anode. Inactive sulfur formed on the surface of the lithium cathode can serve as a protective layer of the lithium cathode. Therefore, a lithium metal and inactive sulfur (e.g., lithium sulfide) formed on the lithium metal can be used as the cathode.

An electrolyte used together with the anode according to the embodiment of the present invention includes lithium salt as support electrolyte salt and a non-aqueous organic solvent. The organic solvent of the electrolyte used in a lithium-sulfur battery may be a solvent that can well dissolve elemental sulfur (S8), lithium sulfide (Li2S), and lithium polysulfide (Li2Sn, where n=2, 4, 6, 8 . . . ). The organic solvent may be one or more solvents selected from the group consisting of benzene, fluorobenzene, toluene, trifluoro toluene, xylene, cyclohexane, tetrahydrofuran, 2-methyl tetrahydrofuran, cyclohexanone, ethanol, isopropyl alcohol, dimethyl carbonate, ethyl methyl carbonate, diethyl carbonate, methyl propyl carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, v-butyrolactone, and sulfolane.

The lithium salt which is the electrolyte salt may be one or more compounds selected from the group consisting of lithium trifluoromethanesulfonimide, lithium triflate, lithium perclorate, lithium hexafluoroarsenate (LiAsF6), lithium trifluoromethanesulfonate (CF3SO3Li), LiPF6, LiBF4, tetraalkylammonium (e.g., tetrabutylammonium tetrafluoroborate), and salts in a liquid state at room temperature (e.g., imidazolium salt such as 1-ethyl-3-methyl imidazolium bis(perfluoroethyl sulfonyl)imide). The electrolyte may contain the lithium salt at a concentration of 0.5 to 2.0 M.

The electrolyte may be used as a liquid electrolyte or a solid electrolyte separator. When used as a liquid electrolyte, the electrolyte further includes a separator. The separator may be a physical separation layer for physically separating electrodes and may be made of porous glass, plastic, ceramic, or polymer.

The electrolyte separator physically separates electrodes and functions as a moving medium for moving metal ions. The electrolyte separator may be made of any electrochemically stable electrical- and ion-conducting material. The electrical- and ion-conducting material may be a glass electrolyte, a polymer electrolyte, or a ceramic electrolyte. In particular, a solid electrolyte may be formed by mixing the support electrolyte salt with a polymer electrolyte such as polyether, polyimine or polythioether.

The solid electrolyte separator may contain a non-aqueous organic solvent in an amount of less than approximately 20% by weight. In this case, the solid electrolyte separator may further contain an appropriate gelling agent in order to reduce the fluidity of the organic solvent.

The present invention will now be described in further detail with reference to the following examples. These examples are for illustrative purposes only, and are not intended to limit the scope of the present invention.

Example 1: Separate Preparation of Anode and Carbon Thin Layer

Denka black was put into an appropriate amount of ethanol to evenly disperse the denka black, and then sonication was performed for 10 minutes. After the sonication, a polytetrafluoroethylene (PTFE) binder was added in a weight ratio of 1:1 (the PTFE binder:denka black) and then mixed for 20 minutes using a homogenizer. The resultant mixture was put into a mortar and crushed until carbons properly clumped together.

The clumped carbons were put into a vinyl bag and then spread thin to a thickness of approximately 1 mm, thereby forming a carbon layer. The carbon layer was dried at 80° C. in a vacuum oven for 12 hours. After dried, the carbon layer was compressed to a thickness of approximately 0.2 mm using a rolling device to produce a carbon thin layer.

Meanwhile, anode active material slurry was prepared by mixing 0.18 g of elemental sulfur (S8) powder, 0.09 g of carbon conductive material and 0.03 g of binder and then ball-milling the mixture for one hour. Here, PVdF and NMP were used as the binder. The content of PVdF in the binder was 5% by weight based on 100% by weight of the entire binder. The anode active material slurry was coated on a carbon-coated aluminum current collector and then dried at 80° C. in a vacuum oven to produce an anode.

Finally, an anode for lithium-sulfur batteries was fabricated by stacking the carbon thin layer on the anode.

Example 2: Separate Preparation of Anode and Carbon Thin Layer Followed by TiN Coating Denka black was put into an appropriate amount of ethanol to evenly disperse the denka black, and then sonication was performed for 10 minutes. After the sonication, a PTFE binder was added in a weight ratio of 1:1 (the PTFE binder:denka black) and then mixed for 20 minutes using a homogenizer. The resultant mixture was put into a mortar and crushed until carbons properly clumped together.

The clumped carbons were put into a vinyl bag and then spread thin to a thickness of approximately 1 mm, thereby forming a carbon layer. The carbon layer was dried at 80° C. in a vacuum oven for 12 hours. After dried, the carbon layer was compressed to a thickness of approximately 0.2 mm using a rolling device to produce a carbon thin layer.

Meanwhile, dispersed TiN powder was obtained by putting 0.1 g of TiN powder into an appropriate amount of ethanol and performing sonication for 10 minutes. The dispersed TiN powder was coated on the carbon thin layer prepared in Example 1 by spray coating in an amount of 3% by weight of the carbon thin layer.

Meanwhile, anode active material slurry was prepared by mixing 0.18 g of elemental sulfur (S8) powder, 0.09 g of carbon conductive material and 0.03 g of binder and then ball-milling the mixture for one hour. Here, PVdF and NMP were used as the binder. The content of PVdF in the binder was 5% by weight based on 100% by weight of the entire binder. The anode active material slurry was coated on a carbon-coated aluminum current collector and then dried at 80° C. in a vacuum oven to produce an anode.

Finally, an anode for lithium-sulfur batteries was fabricated by stacking the TiN-coated carbon thin layer on the anode.

Example 3: Separate Preparation of Anode and TiN-Containing Carbon Thin Layer

An anode was fabricated in the same way as in Example 1, except that TiN powder was mixed with denka black and a PTFE binder in an amount of 50% by weight of the denka black.

Comparative Example 1: Simultaneous Preparation of Anode and Carbon Thin Layer

Anode active material slurry was prepared by mixing 0.18 g of elemental sulfur (S8) powder, 0.09 g of carbon conductive material and 0.03 g of binder and then ball-milling the mixture for one hour. Here, PVdF and NMP were used as the binder. The content of PVdF in the binder was 5% by weight based on 100% by weight of the entire binder. The anode active material slurry was coated on a carbon-coated aluminum current collector and then dried at 80° C. in a vacuum oven to produce an anode.

Next, carbon slurry was prepared by mixing 0.24 g of carbon conductive material and 0.06 g of binder and the ball-milling the mixture for one hour. Here, PVdF and NMP were used as the binder. The content of PVdF in the binder was 5% by weight based on 100% by weight of the entire binder. The carbon slurry was coated on the above electrode and then dried at 80° C. in a vacuum oven to produce an anode.

Comparative Example 2: Preparation of Anode without Carbon Coating

Anode active material slurry was prepared by mixing 0.18 g of elemental sulfur (S8) powder, 0.09 g of carbon conductive material and 0.03 g of binder and then ball-milling the mixture for one hour. Here, PVdF and NMP were used as the binder. The content of PVdF in the binder was 5% by weight based on 100% by weight of the entire binder. The anode active material slurry was coated on a carbon-coated aluminum current collector and then dried at 80° C. in a vacuum oven to produce an anode.

Example 4: Fabrication of Cell

A coin cell evaluation battery was fabricated using the anode prepared in Example 1. An unoxidized lithium metal foil having a thickness of 160 μm was used as a cathode. An electrolyte used was obtained by dissolving 1 M of lithium trifluoromethanesulfonimide and 0.2 M of lithium nitrate in a solvent of tetraethyleneglycol dimethylether and 1,3-dioxolane mixed in a ratio of 50:50. As a separator, a polyethylene separator (having a thickness of 20 μm) produced by SK Corporation was used.

Example 5: Fabrication of Cell

A coin cell was fabricated in the same way as in Example 4, except that the anode prepared in Example 2 was used instead of the anode prepared in Example 1.

Example 6: Fabrication of Cell

A coin cell was fabricated in the same way as in Example 4, except that the anode prepared in Example 3 was used instead of the anode prepared in Example 1.

Comparative Example 3: Fabrication of Cell

A coin cell was fabricated in the same way as in Example 4, except that the anode prepared in Comparative Example 1 was used instead of the anode prepared in Example 1.

Comparative Example 4: Fabrication of Cell

A coin cell was fabricated in the same way as in Example 4, except that the anode prepared in Comparative Example 2 was used instead of the anode prepared in Example 1.

Experimental Example

Photograph of Carbon Thin Layer

FIG. 2 is a photograph of the carbon thin layer prepared in Example 1. It can be identified with the naked eye that the carbon thin layer has an even surface.

Evaluation of Cell Characteristics

The cells of Example 4 and Comparative Examples 3 and 4 were charged and discharged to 0.1 C in a cut-off voltage range of 1.5 V, and useful life characteristics of the cells for 50 or 100 charge and discharge cycles were measured. The results are illustrated in FIGS. 3 and 4.

FIG. 3 illustrates data obtained by evaluating characteristics of the cells of Comparative Examples 3 and 4, and FIG. 4 illustrates data obtained by evaluating characteristics of the cells of Example 4 and Comparative Example 4.

As apparent from FIGS. 3 and 4, the cells of Example 4 and Comparative Example 3 with a carbon coating layer exhibit better characteristics than the cell of Comparative Example 4 without a carbon coating layer.

In addition, Example 4 having a carbon coating layer fabricated from a separate carbon thin layer exhibits better characteristics than Comparative Example 3.

FIG. 5 illustrates voltage curve data of the cell according to Example 4.

Referring to FIG. 5, a flat band voltage appears at 2.4 V and 2.1 V during discharge. This reaction is similar to the reaction of a conventional sulfur electrode. Therefore, even if a carbon thin layer exists between a sulfur anode and a separation layer, Li ions can flow to and react with the sulfur anode without any interference.

The cells of Examples 4 and 5 were charged and discharged to 0.1 C in a cut-off voltage range of 1.5 V, and useful life characteristics of the cells for 15 charge and discharge cycles were measured. The results are illustrated in FIG. 6.

As apparent from FIG. 6, the cell of Example 5 with TiN additionally coated on a carbon thin layer exhibits better characteristics than the cell of Example 4 without TiN coating. This may be because the carbon thin layer captures lithium polysulfide, and the catalyst coated on the carbon thin layer activates a reaction.

While the present invention has been particularly shown and described with reference to exemplary embodiments thereof, it will be understood by those of ordinary skill in the art that various changes in form and detail may be made therein without departing from the spirit and scope of the present invention as defined by the following claims.

The invention claimed is:

1. A method of fabricating an anode for lithium-sulfur batteries, the method comprising:
    mixing a carbon raw material and a binder;
    obtaining a carbon layer by preparing the mixture of the carbon raw material and the binder in the form of a layer;
    drying the carbon layer;
    forming a carbon thin layer by compressing the dried carbon layer;
    stacking the carbon thin layer on an anode for lithium-sulfur batteries; and
    coating a catalyst on the carbon thin layer.

2. The method of claim 1, wherein the carbon raw material is ketjen black, denka black, acetylene black, Super-p, carbon black, graphene, or any combination thereof.

3. The method of claim 1, wherein the drying of the carbon layer is performed at 50 to 100° C.

4. The method of claim 1, wherein a weight ratio of the binder to the carbon raw material is in a range of 0.8 to 1.2.

5. The method of claim 1, wherein the carbon layer has a thickness of 0.8 to 1.2 mm.

6. The method of claim 1, wherein the carbon thin layer has a thickness of 0.1 to 0.3 mm.

7. The method of claim 1, wherein the catalyst is metal nitride.

8. The method of claim 1, wherein the catalyst is coated on the carbon thin layer in an amount of 1 to 5% by weight of the carbon thin layer.

9. A method of fabricating an anode for lithium-sulfur batteries, the method comprising:
   mixing a carbon raw material and a binder;
   obtaining a carbon layer by preparing the mixture of the carbon raw material and the binder in the form of a layer;
   drying the carbon layer;
   forming a carbon thin layer by compressing the dried carbon layer; and
   stacking the carbon thin layer on an anode for lithium-sulfur batteries;
   wherein a catalyst is added in the mixing of the carbon raw material and the binder.

10. The method of claim 9, wherein the catalyst is metal nitride.

11. The method of claim 9, wherein the catalyst is added in an amount of 20 to 60% by weight of the carbon raw material.

12. A lithium-sulfur battery comprising:
    an anode which contains an anode active material;
    a cathode which contains a cathode active material;
    a separator which is located between the anode and the cathode; and
    a carbon thin layer which is located between the anode and the separator, wherein the carbon thin layer has a thickness of 0.1 to 0.3 mm, and wherein the carbon thin layer comprises a carbon raw material, a binder, and a catalyst, wherein the catalyst is metal nitride.

13. The lithium-sulfur battery of claim 12, wherein the carbon thin layer is formed by compressing a carbon layer having a thickness of 0.8 to 1.2 mm.

14. A lithium-sulfur battery comprising:
    an anode which contains an anode active material;
    a cathode which contains a cathode active material;
    a separator which is located between the anode and the cathode;
    a carbon thin layer which is located between the anode and the separator, wherein the carbon thin layer has a thickness of 0.1 to 0.3 mm; and
    a catalyst layer which is located on a surface of the carbon thin layer, wherein the catalyst is made of metal nitride.

15. The lithium-sulfur battery of claim 14, wherein the carbon thin layer is formed by compressing a carbon layer having a thickness of 0.8 to 1.2 mm.

\* \* \* \* \*